(12) United States Patent
Shin et al.

(10) Patent No.: US 6,760,127 B1
(45) Date of Patent: Jul. 6, 2004

(54) MULTI-LEVEL SEMI-VECTOR ERROR DIFFUSION

(75) Inventors: Helen Haekyung Shin, Fairport, NY (US); Zhigang Fan, Webster, NY (US)

(73) Assignee: Xerox Corporation, Stamford, CT (US)

( * ) Notice: Subject to any disclaimer, the term of this patent is extended or adjusted under 35 U.S.C. 154(b) by 993 days.

(21) Appl. No.: 09/585,843

(22) Filed: Jun. 1, 2000

(51) Int. Cl.$^7$ ............................. H04N 1/52; H04N 1/58; G06T 5/00

(52) U.S. Cl. ..................... 358/3.03; 358/3.26; 358/534; 382/252

(58) Field of Search ................................ 358/3.03, 3.05, 358/3.06, 1.9, 534, 535, 536, 3.22, 3.26, 466; 382/252, 270

(56) References Cited

U.S. PATENT DOCUMENTS

| | | | |
|---|---|---|---|
| 5,565,994 A | | 10/1996 | Eschbach .................... 358/298 |
| 5,621,546 A | | 4/1997 | Klassen et al. ............. 358/536 |
| 5,699,167 A | * | 12/1997 | Nozaki et al. ............... 358/1.9 |
| 5,748,785 A | * | 5/1998 | Mantell et al. ............. 382/252 |
| 5,784,496 A | * | 7/1998 | Mantell ....................... 382/252 |
| 6,014,233 A | | 1/2000 | Fan et al. .................... 358/515 |
| 6,072,591 A | | 6/2000 | Harrington .................. 358/1.9 |
| 6,134,023 A | * | 10/2000 | Nozaki et al. ............... 358/1.9 |
| 6,483,606 B1 | * | 11/2002 | Klassen et al. ............. 358/1.9 |
| 6,721,063 B1 | * | 4/2004 | Harrington .................. 358/1.9 |

OTHER PUBLICATIONS

"Selection and Use of Small Color Sets for Pictorial Display", by Venable, et al., Xerox Corporation, Webster, New York, SPSE's 43$^{rd}$ Annual Conference, May, 1990, Rochester, New York.

* cited by examiner

Primary Examiner—Scott Rogers
(74) Attorney, Agent, or Firm—William Eipert

(57) ABSTRACT

A method and apparatus for multi-level color error diffusion employs semi-vector quantization. When operating on image data comprising three color separations, the method employs a vector quantization for the two separations with the most visually perceptive color output to generate a multi-level output pixel for each separation based on the sum and a difference of the input pixel values for the two separations. The method generates multilevel output pixels for the third color separation using scalar error diffusion.

13 Claims, 4 Drawing Sheets

MULTI-LEVEL SEMI-VECTOR ERROR DIFFUSION

BACKGROUND OF THE INVENTION

The present invention generally relates to a method and apparatus to improve the appearance of images produced by an output device. More particularly, the present invention is directed to a method and device for performing multi-level error diffusion using semi-vector quantization.

Error diffusion is a well known technique of processing image data that attempts to maintain the total intensity or gray content of an image when converting an image comprising pixels having one set of gray levels to an image comprising pixels having a different set of gray levels. For example, when reducing continuous tone (contone) image data to one of $N \geq 2$ discrete gray levels, contone data having a gray value falling between the discrete gray levels are often assigned or quantized to the closest gray level, although the algorithm may always assign such intermediate gray values to the next highest (or lowest) gray level. The inherent error resulting from such a choice is propagated in specified amounts to adjacent picture elements or pixels not yet processed. That is, the error in the intensity of the image is diffused and, on average, zero.

The fraction of the error added to each neighbor depends on a set of weights, the total error being multiplied by the weight corresponding to a given neighbor and then added to the value of that neighbor. The choice of weights can greatly affect the image quality, and much has been said about weights appropriate for giving pleasing results. A more complete discussion of error diffusion and weighting coefficients can be found in the following references which are incorporated by reference herein for their teachings: U.S. Pat. No. 5,353,127, entitled "Method For Quantization Gray Level Pixel Data With Extended Distribution Set" to Shiau et al.; U.S. Pat. No. 5,608,821 entitled "Method Of High Addressability Error Diffusion" to Metcalfe et al.; U.S. Pat. No. 5,696,601 entitled "System And Method For Redistributing Error Values From An Error Diffusion Process" to Metcalfe et al.; and U.S. Pat. No. 5,768,432 entitled "System And Apparatus For Pixel Growth Compensation In A Hybrid Error Diffusion Process" to Schweid. It should be appreciated that the references cited above are but a small sample of the available error diffusion techniques known in the art and that the present invention is not meant to be limited to the diffusion techniques shown therein.

In the case of color images, error diffusion cannot simply be applied to each color component independently. To do so would produce noisy images. For example, a light blue can be produced by magenta and cyan pixels. But if the magenta and cyan are processed independently, then some pixels may have both magenta and cyan, yielding blue, while others have no ink at all, giving white. This mixture of white, blue, magenta and cyan will have more contrast and look noisier than pixels of magenta and cyan alone. The process of independently processing each channel can result in any and all of the eight possible pixel colors distributed over an image area. The problem of image noisiness can be reduced by the method of vector error diffusion. In this scheme the color chosen for each pixel is the color in a selected color space closest to the desired value, where the desired value is the input value modified by the errors diffused from neighboring pixels. This tends to confine the pixel colors to a subset near the input value and reduces the noise. What is known as vector error diffusion was described in a paper by Venable et al., "Selection and Use of Small Color Sets for Pictorial Display", Proc IS&T Annual Meeting, Rochester, 1990 and in a paper by Miller et al. "Color Halftoning Using Error Diffusion and a Human Visual System Model", Proc IS&T Annual Meeting, Rochester, 1990. In vector error diffusion colors are treated as points in a three dimensional space, with the colors printable or displayable at a given pixel discrete locations within that space. When a continuous tone color is to be displayed, the closest displayable or printable color is selected, and the error (the difference between the input color and added error, and the output color) is calculated as a vector in color space. Here, the "closeness" might be the simple distance in color space or a weighted distance based on the human visual model. The vector is the difference between the desired color and the available color. The (vector) error is then diffused in the same way as in normal error diffusion.

There are, however, some problems with vector error diffusion. One is the difficult three dimensional computation required to find the closest color at each pixel. Another problem with some implementations of vector error diffusion is that the method may still not select the optimal set of colors. For example, it may produce a gray from white and black pixels, where a smoother image might be produced if cyan, magenta and yellow were used because there would be less luminance contrast.

The following references may be relevant to various aspects of the present invention.

U.S. Pat. No. 6,072,591, entitled "Sum and Difference Error Diffusion" to Harrington and assigned to the same assignee as the present invention, teaches a method for color error diffusion wherein the sum of the three components determines whether a pixel should be black, white or colored. The differences between the components determine whether the pixel should be a primary color, a secondary color or black.

U.S. Pat. No. 5,621,546 suggests performing the error diffusion in two steps. Initially, a simple error diffusion performed on the sum of the requested colorant amounts to indicate when color is needed but not which color is selected. The pixel color is chosen using a vector error diffusion process.

U.S. Pat. No. 5,565,994 teaches multiples separation error diffusion with cross separation correlation control for color images. Each separation of the image is separately processed with an error diffusion process which takes into account the processing of another separation, if any. Output signals from a separation are used to determine threshold values for at least one other separation. The varying thresholds are used to vary the likelihood of the current pixel being a spot or no spot.

U.S. Pat. No. 6,014,233 teaches a method for color error diffusion using semi-vector quantization for three color separations wherein the two separations with the most visually perceptive color output are compared with one another to determine their output colors, while the third, least visually perceptive separation, is treated separately. A correction term may be applied to the third separation based on the color output of the first two separations to insure uniformity of ink coverage.

The references cited herein are incorporated by reference for their teachings.

SUMMARY OF THE INVENTION

One aspect of the present invention is a system for processing color image data comprising multiple color separations, each separation including an array of separation pixels each separation pixel having one of L levels. The system includes two diffusion processors. The first diffusion processor receives a first separation pixel from a first color separation and a second separation pixel from a second color separation and derives a multi-level output value for each of the first and second separation pixels based on a sum and a difference of the first and second separation pixels, the multi-level output values for the first and second separation pixels each being one of k levels wherein1<k<L. The second diffusion processor receives a third separation pixel from a third color separation and generates a multi-level output value for the third separation pixel.

Another aspect of the present invention includes a multi-level error diffusion method. The method includes receiving color image data comprising a plurality of color separations, each color separation including an array of separation pixels, each separation pixel having one of L values; generating a sum S of a first separation pixel and a second separation pixel, the first separation pixel being from a first color separation and the second separation pixel from a second color separation; generating a difference D between the first and second separation pixels; deriving a first multi-level output value for the first separation pixel and a second multi-level output value for the second separation pixel from the sum S and the difference D, the first and second multi-level output values each being one of k values wherein1<k<L; and generating a third multi-level output value for a third separation pixel from a third color separation within the color image data.

BRIEF DESCRIPTION OF THE DRAWINGS

The following is a brief description of each drawing used to describe the present invention, and thus, are being presented for illustrative purposes only and should not be limitative to the scope of the present invention, wherein.

DESCRIPTION OF THE PREFERRED EMBODIMENT

Figure 1:
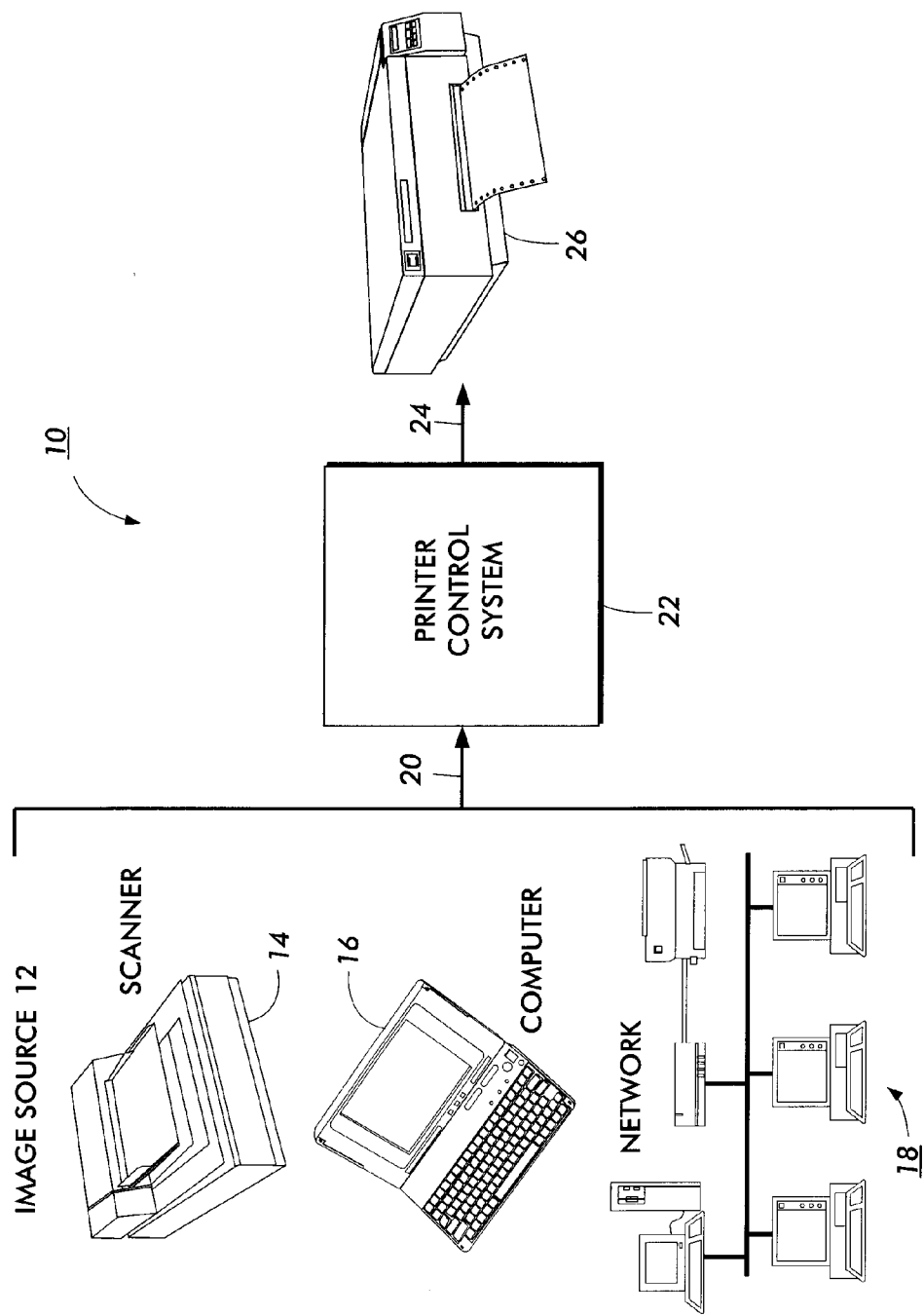
FIG. 1 is a general representation of a suitable system-level embodiment for one or more aspects of the present invention.

The following will be a detailed description of the drawings illustrated in the present invention. In this description, as well as in the drawings, like reference numbers represent like devices, circuits, or circuits performing equivalent functions.

Each location in an image may be called a "pixel." The term "pixel" may refer to an electrical or optical, if fiber optics are used, image signal which represents physical optical properties at a physically definable area on an image. Each pixel value is a bit in a binary or bitmapped image, a grayscale (or simply gray) value in a grayscale or continuous tone (contone) image, or a set of color space coordinates in a "color coordinate form" of an image with the binary, contone, and color coordinate form each being a two-dimensional array defining an image. In this context, pixels are described as discrete image signals, which represent optical density of the document image in a given area thereof.

The present invention is described as operating on color image data comprising two or more color planes or separations that are combined to form a composite image. Each color plane (separation) comprises a set of image signals or separation pixels which will drive a printer to produce one color separation of the image. In the case of multicolor printers, the separations, superposed together, form the color image. The term "separation pixel" will be used to refer to such an image signal in each separation, as distinguished from "color pixel", which is the sum of the color densities of corresponding pixels in each separation. "Gray", as used herein does not refer to a color unless specifically identified as such. Rather, the term refers to image signals which vary between maximum and minimum, irrespective of the color of the separation in which the signals are used. For purposes of describing the present invention, reference will be made to image data comprising four color separations, Cyan, Magenta, Yellow and black (CMYK). Each color pixel comprises four associated separation pixels, one for each of the CMYK separations. Although those skilled in the art will recognize that the present invention is applicable to a different number of separations as well as different combinations of color separations.

Turning now to FIG. 1, there is shown an embodiment of an exemplary printing system 10 that incorporates the features of the present invention. Printing system 10 includes image source 12 that may include scanner 14, computer 16, network 18 or any similar or equivalent image input terminal providing digital image data 20 which may include any combination of bitmapped data, grayscale or contone data, color coordinate data, graphics primitives, page description language (PDL), etc. Image data 20 is supplied to image processing system 22 which processes the received image data 20 to produce print data 24 for rendering on image output terminal (IOT) 26. Image processing system 22 may comprise what is commonly referred to in the art as a DFE, print driver, or the like. Those skilled in the art will recognize that image processing system 22 may be implemented in hardware and/or software and may reside within in image source 12, within IOT 26, within a separate component or in any combination thereof.

In response to print data 24, which may comprise image data and/or printer control signals (e.g., paper handling, carriage control, ink deposition), IOT 26 generates an output image on a suitable print medium (e.g., print or display). Beneficially, IOT 26 comprises an ink jet printer; however, IOT 26 may include alternative print engines employing equivalent marking process alternatives such as electrostatographic, electrophotographic, ionographic, thermal, etc. Moreover, image processing system 22 may be incorporated in electronic display systems such as CRTs, LCDs, LED, etc. The present invention is directed towards aspects of printer control system 22 depicted in FIG. 1. In particular, the present invention is directed to a system and method for performing semi-vector error diffusion in devices employing multi-level printing.

Figure 4:
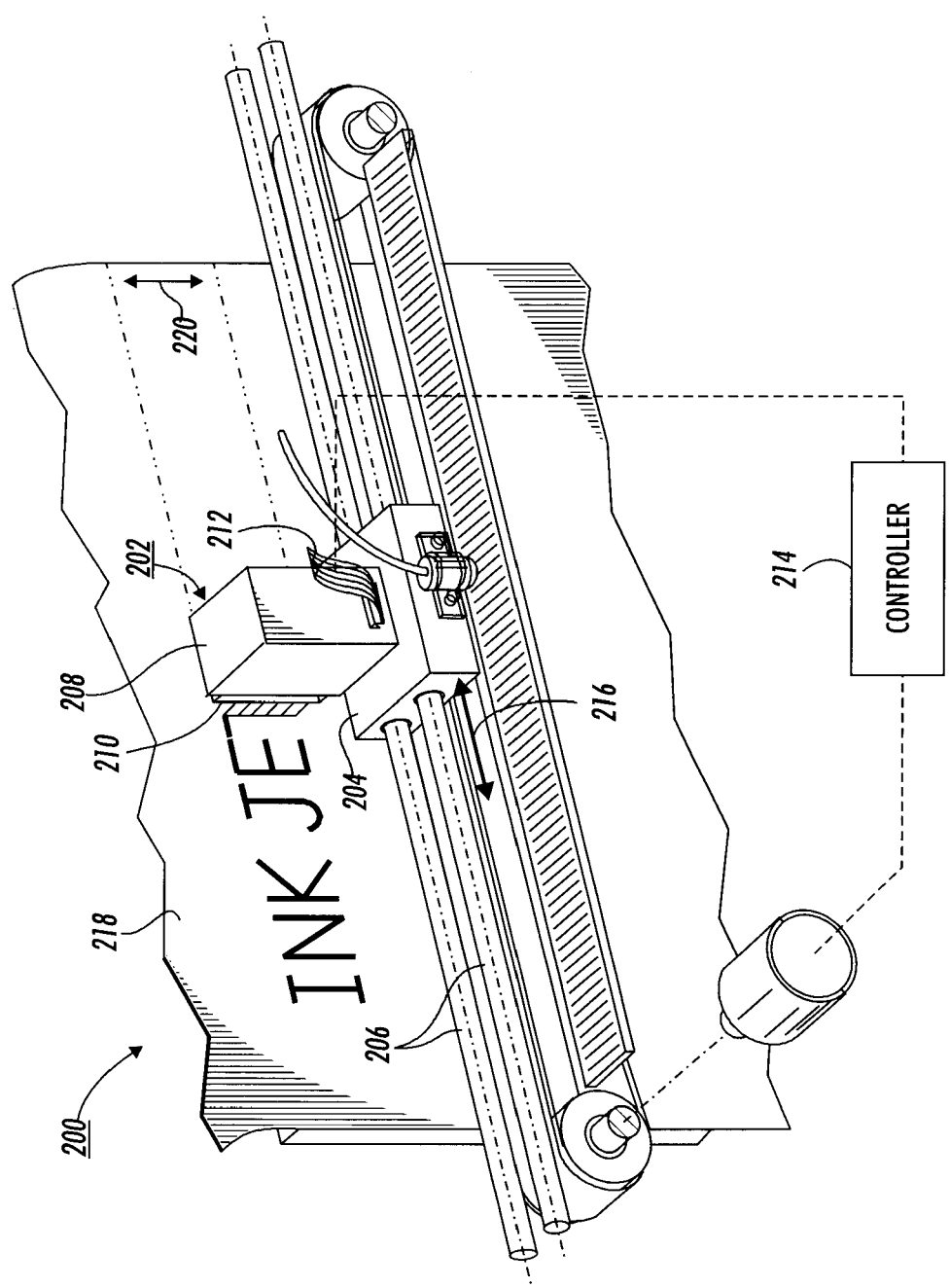
FIG. 4 is a partial schematic perspective view of an ink jet printer suitable for use with one or more aspects of the present invention.

Turning now to FIG. 4, there is shown a partial schematic perspective view of an ink jet printer 200 suitable for use as IOT 26 in the system of FIG. 1. Printer 200 includes an ink jet printhead cartridge 202 mounted on carriage 204 supported by carriage rails 206. The printhead cartridge 202 includes housing 208 containing ink for supply to printhead 210 which selectively expels droplets of ink in response to control signals received from controller 214 through a communication cable 212. Printhead 210 contains a plurality of ink conduits or channels (not shown) which carry ink from housing 208 to respective ink ejectors, which eject ink through orifices or nozzles (also not shown). To effectuate printing, controller 214 is coupled to one or more printhead control circuits (not shown). The printhead control circuits receive information from controller 214 via control signals received through communication cable 212. In accordance with the content of the signals received, the control circuits provide for selected ejection of inks from the nozzles of printhead 210.

When printing, carriage 204 reciprocates or scans back and forth along carriage rails 206 in the directions of arrow 216. As the printhead cartridge 202 reciprocates back and forth across a recording medium 218, such as a sheet of paper or transparency, droplets of ink are expelled from selected ones of the printhead nozzles towards the recording medium. During each pass of carriage 204, the recording medium 218 is held in a stationary position. Upon the completion of one or more passes, the recording medium is advanced in the direction of arrow 220 by a feed mechanism under control of controller 214.

Figure 2:
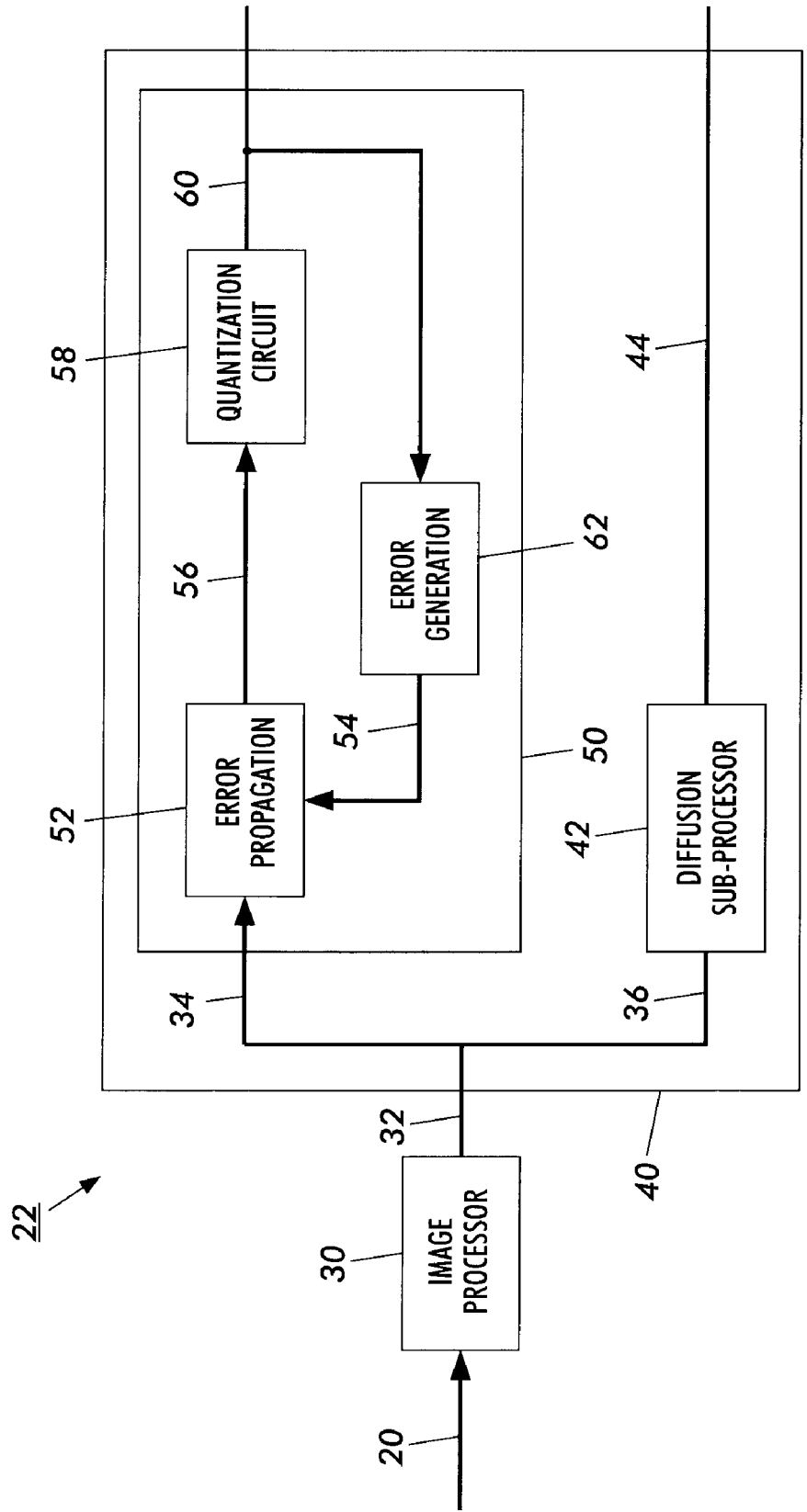
FIG. 2 is a block diagram illustrating a generalized data flow through one embodiment of the present invention.

Referring now to FIG. 2, there is shown a block diagram depicting the data flow in an embodiment of image processing system 22 including an operation for multi-level error diffusion with semi-vector quantization in accordance with the teachings of the present invention. In the course of processing the digital image data, including other processes (not shown) that operate on the image data, image processing system 22 preferably operates to transform digital image data 20 into print ready image data for transfer to a marking engine for output on tangible media (e.g., print or display). Although other image processing operations may be conducted within the image processing system, the present invention includes those aspects directed to semi-vector error diffusion for multi-level printing wherein contone image data having L levels is converted into multi-level output data having k levels wherein 1<k<L.

In FIG. 2, digital image data 20 which may comprise one or more forms such as a page description language (PDL), contone data, etc is received at image processor 30. After receipt, image processor 30 employs any of a number of well known image processing operations to process digital image data 20 into processed image data 32. For example, processor 30 may operate to decompose the PDL file or other document information and process the image data in accordance with such information. As discussed herein, image processor 30 provides image data 32 in terms of three color separations (e.g., CMY) wherein each of the three separations include pixel data for a plurality of pixels arranged in 'm' rows and 'n' columns. The gray value at each pixel location (m,n) of the first, second, and third separations is defined with 8 bits (e.g., between 0 and 255); however, it is understood that the gray value of the pixels can be defined by any number of bits/pixel. Beneficially, image processor 30 also operates on the received image data such that image data 32 is linearized.

Those skilled in the art will recognize that image data 20 supplied to processor 30 may be provided in any suitable color space, and that conversions may be readily made between various color spaces, without departing from the scope and intent of the present invention. For example, the image data 22 may be supplied in terms of the red, green, blue (RGB) color space, or any other color space, and processor 30 may convert the data to cyan, magenta, yellow (CMY) space in any known manner.

The continuous tone separation pixel data 32 is supplied to semi-vector error diffusion processor 40. More specifically, image data 34 corresponding to two of the three separations comprising pixel data 32 is supplied to a first diffusion sub-processor 50 and image data 36 corresponding to the third separation is supplied to a second diffusion sub-processor 42. The separations sent to sub-processor 50 and sub-processor 42 are selected in a manner such that the quantization of the darker color components can be coordinated.

In order to yield the least perceptual noise in an output image it is known that quantization should be performed in perceptually orthogonal color spaces as this allows for the color components to be treated separately. Moreover, the lightness component should be treated differently than the chroma components to produce better quality and less noisy color images, as taught in Venable et al., "Selection and Use of Small Color Sets for Pictorial Quality", SPSE's 43rd Annual Conf., May 1990, Rochester, N.Y., p.90–92. Thus, the least visual impact on the color image is obtained when the quantization of the darkest color components are coordinated with one another and the lightest color component(s) are treated independently. The present example uses CMY color components; however, any color space with substantially orthogonal components may be used. When using CMY color components, yellow is the lightest color and is processed independently of the darker cyan and magenta components. That is, to provide images with very little perceptual noise the C and M components beneficially are processed together in sub-processor 50 and the yellow separation is processed independently in sub-processor 42.

In sub-processor 50, image data 34 comprising the pixel values of the current separation pixels of the C and M components is received at error propagation circuit 52. Error propagation circuit 52 also receives distributed error signal 54 comprising the distributed errors $e_C(m,n)$ and $e_M(m,n)$ for the previously processed cyan and magenta separations, respectively, to be applied to the current separation pixels. Propagation circuit 52 adds the distributed errors $e_C(m,n)$ and $e_M(m,n)$ to the pixel values received as image data 34 to obtain modified pixel values 56 for the C and M components which are then passed to quantization circuit 58.

Quantization circuit 58 receives modified pixel values 56 for the C and M components and derives a sum and a difference of the modified pixel values. Based on the sum and difference, circuit 58 generates multi-level output signal 60 comprising the multi-level output values $O_C(m,n)$ and $O_M(m,n)$ for the cyan and magenta separation pixels. Output signal 60 can be used to drive an image output terminal to print or display cyan and/or magenta on suitable media based on multi-level output values for the cyan and magenta separation pixels. Optionally, output signal 60 is further supplied to error generation circuit 62.

Error generation circuit 62 generates an error indicative of the difference between gray level of input pixel value and the gray level of the multi-level output value for the cyan and magenta separation pixels. Based upon this error measurement, circuit 62 redistributes or diffuses the error to a selected group of unprocessed input pixels within image data 34 in accordance with a set of error weighting coefficients.

The operation of diffusion sub-processor 50 can best be shown by way of example wherein image data 34 comprises input pixel value $i_C(m,n)$ for the current cyan separation pixel and $i_M(m,n)$ for the current magenta separation pixel. For purpose of this discussion, the range of pixel values for the cyan and magenta separation pixels have been normalized, that is $0 \leq i_C(m,n) \leq 1$ and $0 \leq i_M(m,n) \leq 1$. Additionally, the present example assumes that the number of output levels, k, for each of the cyan separation output $O_C(m,n)$ and the magenta separation output $O_M(m,n)$ is four (i.e., k=4) with the set of possible output values comprising $\{0, 1/3, 2/3, 1\}$.

In operation, error propagation circuit 52 receives input pixel values $i_C(m,n)$ and $i_M(m,n)$ for the current pixel and adds the distributed errors $e_C(m,n)$ and $e_M(m,n)$ to the input pixel values $i_C(m,n)$ and $i_M(m,n)$ to obtain modified pixel values $i^*_C(m,n)$ and $i^*_M(m,n)$. The modified pixel values $i^*_C(m,n)$ and $i^*_M(m,n)$ for the current pixel are passed to quantization circuit 58 wherein a sum and a difference of the modified pixel values $i^*_C(m,n)$ and $i^*_M(m,n)$ are generated. More specifially, circuit 58 generates a sum S according to $$S = \text{Round}\{3[i^*_C(m,n)+i^*_M(m,n)]\}. \quad (1)$$

If $S \leq 0$, the outputs values are $O_C(m,n)=O_M(m,n)=0$, and if $S \geq 6$, the output values are $O_C(m,n)=O_M(m,n)=1$.

If $0 \leq S \leq 6$, circuit 58 determines the difference D according to $$D = i^*_C(m,n) - i^*_M(m,n) \quad (2)$$

and derives the multi-level output values according to table 1:

TABLE 1

| S | D | $O_C(m,n)$ | $O_M(m,n)$ |
|---|---|---|---|
| S ≤ 0 | N/A | 0 | 0 |
| S = 1 | 0 ≤ D | 1/3 | 0 |
|  | D < 0 | 0 | 1/3 |
|  | 1/3 ≤ D | 2/3 | 0 |
| S = 2 | -1/3 ≤ D < 1/3 | 1/3 | 1/3 |
|  | D < -1/3 | 0 | 2/3 |
|  | 2/3 ≤ D | 1 | 0 |
| S = 3 | 0 ≤ D < 2/3 | 2/3 | 1/3 |
|  | -2/3 ≤ D < 0 | 1/3 | 2/3 |
|  | D < -2/3 | 0 | 1 |
|  | 1/3 ≤ D | 1 | 1/3 |
| S = 4 | -1/3 ≤ D < 1/3 | 2/3 | 2/3 |
|  | D < -1/3 | 1/3 | 1 |
| S = 5 | 0 ≤ D | 1 | 2/3 |
|  | D < 0 | 2/3 | 1 |
| S ≥ 6 | N/A | 1 | 1 |

More generally, for input pixel values having a range from 0 to L ($0 \leq i_C(m,n), i_M(m,n) \leq L$) that are quantized to one of k output values given by:

$$jL/(k-1) \text{ for } j=0 \text{ to } k-1, \quad (3)$$

S is first obtained as $$S = \text{Round}\left\{\frac{(k-1)[i^*_C(m,n)+i^*_M(m,n)]}{L}\right\}. \quad (4)$$

Both output values $O_C(m,n)$ and $O_M(m,n)$ will be 0 if $S \leq 0$. Similarly, both output values will be L if $S \geq 2k-2$. Otherwise, D is evaluated according to equation (2) above and the output pixel values $O_C(m,n)$, $O_M(m,n)$ are quantized to one of the K output values given by equation (3) above according to:

$$O_C(m,n) + O_M(m,n) = SL/(k-1) \quad (5)$$

wherein D determines the relative strength of $O_C(m,n)$ and $O_M(m,n)$.

The quantized output pixel values 60 generated at circuit 58 are provided to diffusion error generation circuit 62. Error diffusion is a well-known method of processing image data wherein the quantization error is distributed or diffused onto the unprocessed (downstream) pixels. Generally, in an error diffusion process the quantization error is passed or diffused to a selected group of downstream pixels in accordance with a set of error weighting coefficients. The downstream pixels receiving a weighted error as well as the weighting coefficients can remain constant or be dynamically modified.

At circuit 62, quantized output generated at circuit 58 is analyzed to estimate the gray-level quantization error, if any, incurred by the chosen quantization level. A gray-level quantization error is a measure of the difference in the total gray content of an image neighborhood incurred when an image comprising pixels having one set of gray levels is converted to an image comprising pixels having a different set of gray levels. A gray-level quantization error that manifests itself as a local density error often will be incurred when there are fewer, or different, gray levels in the output pixels than the input pixels. On a macro scale, the error may appear as a noticeable pattern defect or the error may result in an image region being too light or too dark. Circuit 62 generates the quantization error by comparing the gray level of the input pixels with the gray level density of the output pixels to derive a rendering error signal that provides a measure of the gray-level quantization error for the output pixels $O_C(m,n)$ and $O_M(m,n)$ and diffuses the error onto unprocessed neighboring pixels.

Turning now to the lightest component, the yellow component output is independently determined using other conventional image processing techniques such as scalar quantization, error diffusion or halftoning to generate multi-level output signal 44 comprising the multi-level output values $O_Y(m,n)$ for the yellow separation pixels. As described earlier, independently processing yellow will have minimum affect on overall image quality due to the fact that it has the least visual impact on the image. Optionally, if uniformity of an output image can be improved using a correction term based on the results of the quantization procedure of sub-processor 50. One such correction term is given by:

$$\gamma[O_C(m,n)+O_M(m,n)-i^*_C(m,n)-i^*_M(m,n)] \quad (6)$$

where gamma is between 0 and 1 and $O_C(m,n)$, $O_M(m,n)$, $i^*_C(m,n)$ and $i^*_M(m,n)$ are defined above in the cyan and magenta quantization procedure of sub-processor 50. The correction term should average to 0 with gamma depending upon the type of reproduction machine and ink used as well as the desired visibility of the yellow component. When the correction term is positive, the output of yellow is reduced and when the correction term is negative, the output of yellow is increased.

Figure 3:
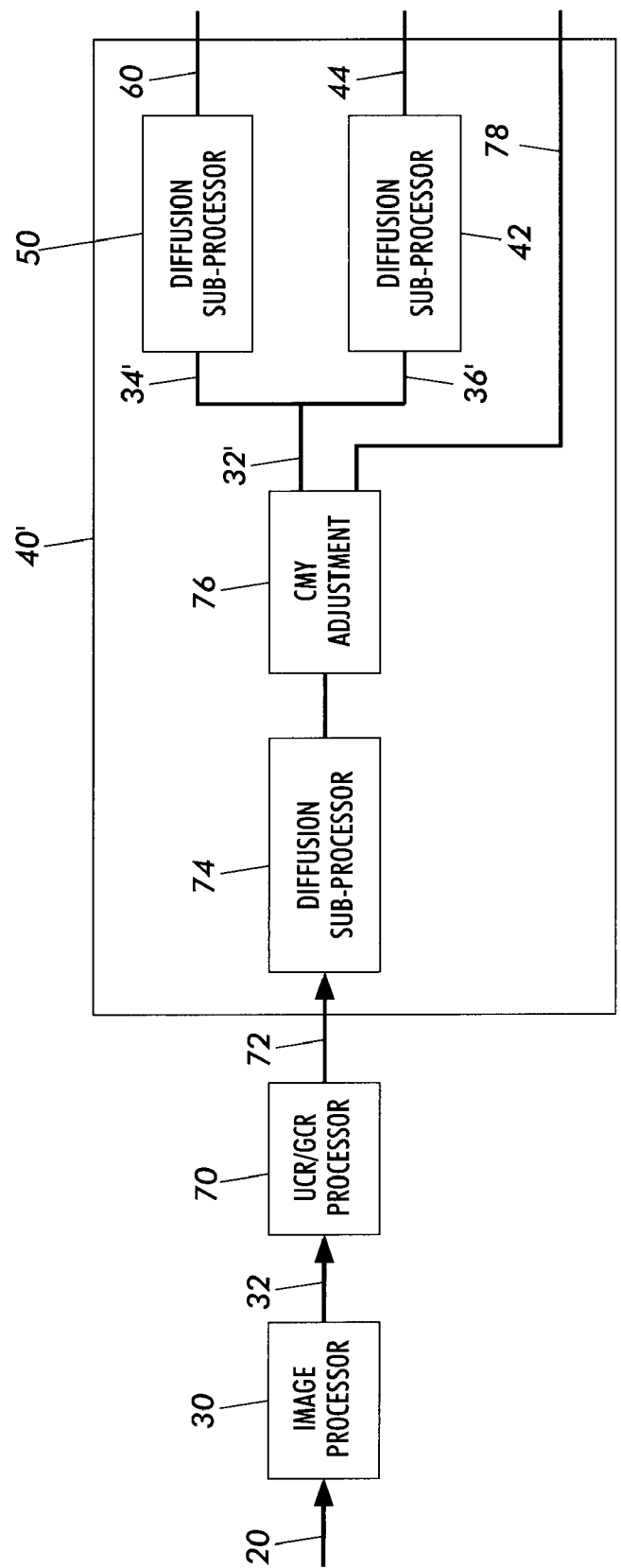
FIG. 3 is a block diagram illustrating a generalized data flow through one embodiment of the present invention.

It should be appreciated that the system and method described above in reference to FIG. 2 can be easily modified to operate as a multi-level error diffusion for image data comprising four component (i.e., CMYK). Referring to FIG. 3, there is shown one embodiment of a diffusion processor 40' for performing semi-vector error in accordance with the teachings of the present invention. In the system of FIG. 3, CMY image data 32 from processor 30 is supplied to UCR/GCR processor 70 wherein the CMY color image data 32 is converted into CMYK image data 72.

Methods for converting from the CMY color space to the CMYK color space are commonly referred to as "undercolor removal" (UCR) and "gray-component replacement" (GCR). UCR/GCR methods vary, but commonly involve examining the individual pixels of an image using the lowest or "darkest" of the three cyan-magenta-yellow colors to determine an amount of black to be added (Undercolor Removal). One or more of the CMY colors are then adjusted, often by subtracting the amount of black added from one or more separation pixels for the CMY separations. Other UCR/GCR methods are known, but each seeks to determine the level of black for a given pixel, and to thereafter adjust the other colors accordingly to account for the addition of black ink.

In processor 70, the contone image data for each pixel location i(m,n) of the cyan, magenta and yellow separations are analyzed in accordance with any UCR method to derive a pixel value $i_K(m,n)$ for the corresponding black separation pixel. After deriving the pixel value $i_K(m,n)$ for the black separation pixel, processor 70 performs a GCR operation by subtracting the pixel value $i_K(m,n)$ from each of the correspondingly located pixel values $i_C(m,n)$, $i_M(m,n)$ and $i_Y(m,n)$ of the cyan, magenta and yellow separations to thereby generate CMYK image data 72.

The CMYK image data 72 is supplied to black component diffusion sub-processor 74 within diffusion processor 40' which implements any of numerous well known scalar error diffusion or other halftoning methods, but only on the black separation pixels, to generate multi-level output values $O_K(m,n)$ quantized to one of k levels (e.g., 0, ⅓, ⅔, 1) for the black separation pixels. After a multi-level output black separation pixel value $O_K(m,n)$ is generated each of the corresponding pixel values i(m,n) for the cyan, magenta and yellow separations of image data 72 are adjusted at CMY adjustment processor 76. More specifically, processor 76 adjusts the pixel values i(m,n) for the cyan, magenta and yellow separations by subtracting the difference between the multi-level output black pixel value and the input black pixel value, $O_K(m,n)-i_K(m,n)$, therefrom to generate adjusted image data 32' comprising adjusted input pixel values $i'_C(m,n)$, $i'_M(m,n)$ and $i'_Y(m,n)$ for the cyan, magenta and yellow separations. Processor 76 further provides multi-level output signal 78 comprising the multi-level output black pixel value $O_K(m,n)$ as an output.

Image data 32' comprising image data 34' corresponding to the adjusted cyan and magenta separations is supplied to a diffusion sub-processor 50 and image data 36' corresponding to the adjusted yellow separation is supplied to diffusion sub-processor 42. Error diffusion sub-processors 42 and 50 correspond exactly to and operate in the same manner as previously discussed with reference to FIG. 2 to generate multi-level output signal 60 comprising the multi-level output values $O_C(m,n)$ and $O_M(m,n)$ for the cyan and magenta separation pixels and multi-level output signal 44 comprising the multi-level output values $O_Y(m,n)$ for the yellow separation pixels.

It should be appreciated that the functions of processors 70, 74 and 76 can be combined into a single processor which operates in the following manner. Analyze the C,M,Y separation pixel data 32 to derive a contone pixel value $i_K(m,n)$ for each black separation pixel according to any suitable undercolor removal (UCR) method (at this point the contone C,M,Y separation pixel values remain unaltered). Perform any suitable scalar quantization, error diffusion or halftoning methods on the contone black separation, to generate a pixel multi-level output value $O_K(m,n)$ for each black separation pixel. Then, on a pixel-by-pixel basis, perform a GCR operation to subtract multi-level pixel value $O_K(m,n)$ from each of the pixel values i(m,n) for the cyan, magenta and yellow separations to generate adjusted image data 32' comprising adjusted input pixel values $i'_C(m,n)$, $i'_M(m,n)$ and $i'_Y(m,n)$. The combination of the three processors into a single processor may be used to reduce the overall number of components used and operations performed. However, this reduction makes the determination of the CMYK data dependent upon the error diffusion operation, and thus, comes at the expense of a loss in modularity and flexibility.

More information concerning an apparatus and method for performing error diffusion on a black color separation and using the black separation error diffusion image to modify the unprocessed color separations can be found in U.S. patent application Ser. No. 09/082,157, entitled "Method And Apparatus For Error Diffusion And Undercolor Removal/Grey Component Replacement Of Digital Color Images" to Zhigang Fan filed May 20, 1998, and assigned to the same assignee as the present invention.

One skilled in the art would understand that the processors and processing modules described above can embody or be implemented using a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. Furthermore, specific algorithms may be accomplished using software in combination with specific hardware. In general, any device capable of implementing a finite state machine that is in turn capable of implementing a process, function or operation described above can be used to realize the associated processor or module.

While the present invention has been described with reference to various embodiments disclosed herein, it is not to be confined to the details set forth above, but it is intended to embrace all such alternatives, modifications and variations as fall within the spirit and broad scope of the appended claims.

What is claimed is:

1. A system for processing color image data comprising multiple color separations, each separation including an array of separation pixels each separation pixel having one of L levels, comprising:

a first diffusion processor receiving a first separation pixel from a first color separation and a second separation pixel from a second color separation and deriving a multi-level output value for each of the first and second separation pixels based on a sum and a difference of the first and second separation pixels, the multi-level output values for the first and second separation pixels each being one of k levels wherein $1 \leq k \leq L$; and a second diffusion processor receiving as input a third separation pixel from a third color separation, the second diffusion processor generating a multi-level output value for the third separation pixel.

2. The system of claim 1, wherein the sum of the first and second separation pixels is given by:

$$S = Round\left\{\frac{(k-1)[i_c + i_m]}{L}\right\}$$

wherein $i_c$ is the first separation pixel and $i_m$ is the second separation pixel.

3. The system of claim 2, wherein the k levels for the multi-level output values for the first and second separation pixels are given by jL/(k−1) for j=0 to k−1.

4. The system of claim 1, wherein the second diffusion processor further includes a correction circuit for determining a correction term to be added to the multi-level output value for the third separation pixel, wherein the correction term is given by $$\gamma[O_C+O_M-i_C-i_M]$$

where γ is between 0 and 1; $O_C$ is the multi-level output value for the first separation pixel; $O_M$ is the multi-level output value for the second separation pixel; $i_c$ is the first separation pixel and $i_m$ is the second separation pixel.

5. The system of claim 1, wherein the first and second separations are cyan and magenta and the third separation is yellow.

6. The system of 1, wherein the first and second separations are red and green and the third separation is blue.

7. The system of claim 1, further comprising:
a third diffusion processor, the third diffusion processor receiving a fourth separation pixel from a fourth color separation and generating a multi-level output value for the fourth separation pixel; and
a separation adjustment processor generating one of the first, second and third separation pixels by subtracting a difference between the multi-level output value for the fourth separation pixel and the value of the fourth separation pixel from a separation pixel in one of the first, second and third separations.

8. A multi-level error diffusion method, comprising the steps of:
receiving color image data comprising a plurality of color separations, each color separation including an array of separation pixels, each separation pixel having one of L values;
generating a sum S of a first separation pixel and a second separation pixel, the first separation pixel being from a first color separation and the second separation pixel from a second color separation;
generating a difference D between the first and second separation pixels;
deriving a first multi-level output value for the first separation pixel and a second multi-level output value for the second separation pixel from the sum S and the difference D, the first and second multi-level output values each being one of k values wherein 1≤k≤L; and
generating a third multi-level output value for a third separation pixel from a third color separation within the color image data.

9. The method of claim 8, further comprising the steps of:
generating a fourth multi-level output value for a fourth separation pixel from a fourth color separation within the color image; and
subtracting a difference between the fourth multi-level output value and the value of the fourth separation pixel from at least one separation pixel in one of the first, second and third color separations.

10. The method of claim 8, further comprising the steps of:
generating an error value as a function of a difference between the first multi-level output value and the value of the first separation pixel; and
subtracting the error value from a separation pixel in first color separation.

11. The method of claim 8, wherein the sum S is given by:

$$S = Round\left\{\frac{(k-1)[i_c + i_m]}{L}\right\}$$

wherein $i_c$ is the first separation pixel and $i_m$ is the second separation pixel.

12. The method of claim 11, wherein the k values for the first and second multi-level output values are given by jL/(k−1) for j=0 to k−1.

13. The method of claim 8, wherein the step of generating a third multi-level output value further comprises adding a correction term the third multi-level output value, wherein the correction term is given by $$\gamma[O_C+O_M-i_Ci_M]$$

where γ is between 0 and 1; $O_C$ is the first multi-level output value; $O_M$ is the second multi-level output value; $i_c$ is the first separation pixel and $i_m$ is the second separation pixel.

* * * * *